United States Patent
Kaminaga

(10) Patent No.: US 7,605,796 B2
(45) Date of Patent: Oct. 20, 2009

(54) REPRODUCTION APPARATUS, CAMERA, AND DISPLAY SWITCH METHOD OF REPRODUCTION APPARATUS

(75) Inventor: Tomomi Kaminaga, Hachioji (JP)

(73) Assignee: Olympus Corporation, Tokyo (JP)

( * ) Notice: Subject to any disclaimer, the term of this patent is extended or adjusted under 35 U.S.C. 154(b) by 678 days.

(21) Appl. No.: 11/190,773

(22) Filed: Jul. 27, 2005

(65) Prior Publication Data

US 2006/0022961 A1    Feb. 2, 2006

(30) Foreign Application Priority Data

Jul. 28, 2004   (JP)   ............... 2004-220606

(51) Int. Cl.
*G09G 3/36*    (2006.01)
(52) U.S. Cl. .................. 345/104; 345/688; 345/55
(58) Field of Classification Search ............... 345/104, 345/688, 55
See application file for complete search history.

(56) References Cited

U.S. PATENT DOCUMENTS

| | | | |
|---|---|---|---|
| 6,542,171 B1 * | 4/2003 | Satou et al. ............. | 715/833 |
| 2003/0095096 A1 | 5/2003 | Robbin et al. | |
| 2003/0123859 A1 | 7/2003 | Ikeda | |

FOREIGN PATENT DOCUMENTS

| | | |
|---|---|---|
| JP | 11-231989 | 8/1999 |
| JP | 2001-268507 | 9/2001 |
| JP | 2002-034023 | 1/2002 |
| JP | 2004-104594 | 4/2004 |
| WO | WO 03/073411 | 9/2003 |
| WO | WO 03/073411 A1 * | 9/2003 |

OTHER PUBLICATIONS

Notice of Reasons for Rejection for Japanese Patent Application No. 2004-220606, mailed Jun. 2, 2009 (2 pgs.) with translation (2 pgs.).

* cited by examiner

*Primary Examiner*—Richard Hjerpe
*Assistant Examiner*—Leonid Shapiro
(74) *Attorney, Agent, or Firm*—Straub & Pokotylo; John C. Pokotylo

(57) ABSTRACT

A reproduction apparatus of the present invention includes an image display device with a touch panel, a picked-up image is displayed on a display unit of the display device, and an annular object, for example, is superimposed on the picked-up image and displays the object when necessary. When the touch panel is manipulated so as to draw a circle or an arc by tracing the annular object with a finger, a displayed picked-up image to be displayed is continuously switched in a forward direction or in a reverse direction according to a drawing (turning) direction of the circle or the arc.

7 Claims, 12 Drawing Sheets

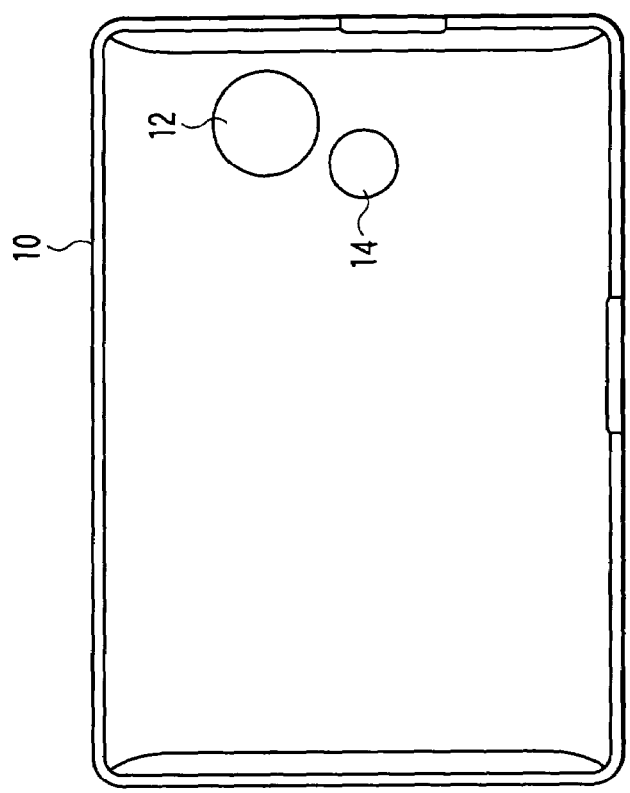
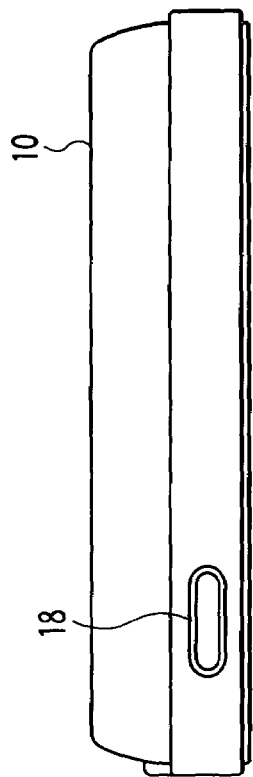
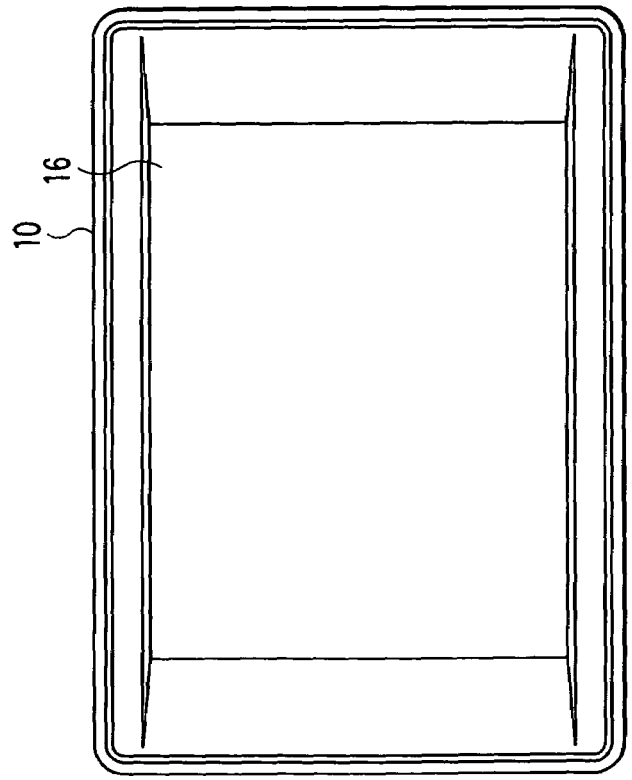

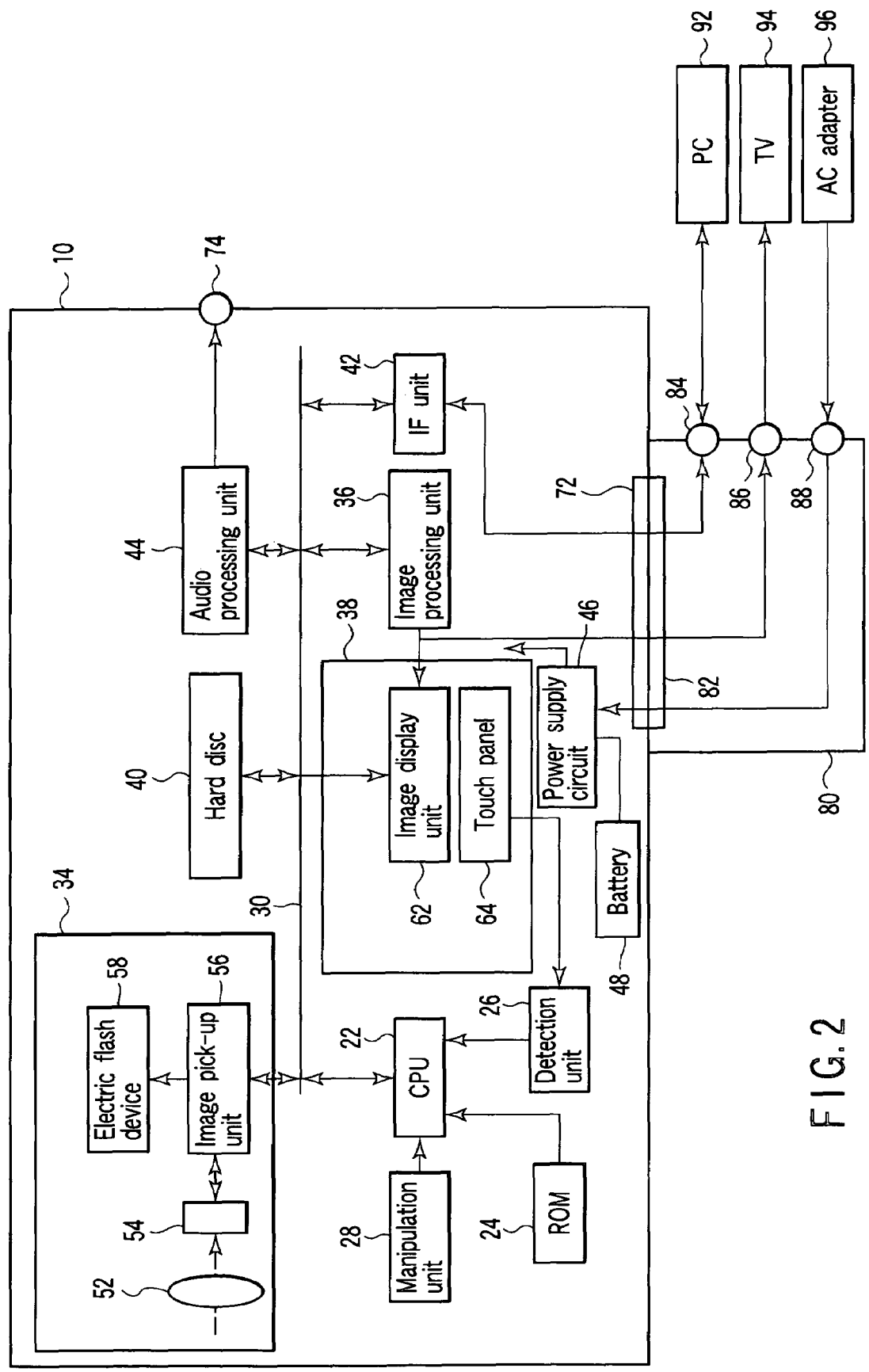
F I G. 2

REPRODUCTION APPARATUS, CAMERA, AND DISPLAY SWITCH METHOD OF REPRODUCTION APPARATUS

CROSS-REFERENCE TO RELATED APPLICATIONS

This application is based upon and claims the benefit of priority from prior Japanese Patent Application No. 2004-220606, filed Jul. 28, 2004, the entire contents of which are incorporated herein by reference.

BACKGROUND OF THE INVENTION

1. Field of the Invention

The present invention relates to a user interface technology making use of a touch panel for promptly searching a target image from, for example, a lot of images.

2. Description of the Related Art

Recently, since the capacity of semiconductor memories is increased and the cost thereof is reduced, semiconductor memories having a large capacity are used even in mobile equipment such as PDAs (personal digital assistants), digital cameras, and the like. Accordingly, since the number of images that can be recorded in a single recording medium is more and more increased, there is required a search method of searching a target image from a lot of images recorded in a recording medium by a simple manipulation in a short time.

Among this type of search methods, a most popular method is a method of displaying a plurality of index images at a time and sequentially forwarding the images by an XY operation key and the like. Further, as a method of forwarding images other than the above method, there is a method of using a jog dial. Jpn. Pat. Appln. KOKAI Publication No. 11-231989 and the like, for example, propose a method of providing a jog dial on a surface confronting an LCD (liquid crystal display) mounting surface on the circumferential wall of a main body and rotating the jog dial to thereby sequentially switching the image displayed on the LCD.

In contract, in desktop electronic equipment, a touch panel (sometimes referred to as a touch screen) is widely used as a device for receiving an input from a user. Since the touch panel requires a certain extent of a manipulation area, it is not suitable for mobile equipment having a small screen. Recently, however, since a large-size LCD can be mounted on also the mobile equipment, in addition to that the cost of LCDs is reduced, the environment surrounding the touch panel is being changed to the environment in which the touch panel can be easily used.

A touch motion as if a button is depressed is well known as a method of manipulating the touch panel. In addition to the above method, Jpn. Pat. Appln. KOKAI Publication No. 2004-104594 and the like, for example, propose a method of executing a slide motion so as to draw a straight line on the surface of a touch panel and changing a reproduction speed of an image according to the direction in which the surface is traced by the slide motion and to the speed of the slide motion.

BRIEF SUMMARY OF THE INVENTION

Accordingly, an object of the present invention is to provide a reproduction apparatus, a camera, and a display switch method of suitably manipulating a touch panel when a target image is searched from a lot of images and improving the usability of the touch panel.

To achieve the above object, the present invention provides a reproduction apparatus comprising:

a display unit which displays an image;

a touch panel disposed on the display means;

an object display unit which causes an object, which guides a slide motion for drawing a circular or arc locus on the touch panel, to be superimposed on a displayed image and to be displayed on the display unit;

a detection unit which detects the slide motion executed on the touch panel to trace the object displayed on the object display unit; and a display switch unit which continuously switches, when the slide motion is detected by the detection unit, an image to be displayed on the display unit.

Further, the present invention provides a reproduction apparatus comprising:

a touch panel disposed on a display screen;

a first display switch unit which continuously switches, when a slide motion for drawing a circular or arc locus is executed on the touch panel, an image on the display screen; and a second display switch unit which switches, when a single touch motion is executed to the touch panel, the image on the display screen to another image.

Furthermore, the present invention provides a display switch method of a reproduction apparatus having display means for displaying an image and a touch panel disposed on the display means, the method comprising the steps of:

superimposing an object, which guides a slide motion for drawing a circular or arc locus on the touch panel, on a displayed image and displaying the object on the display means;

detecting a slide motion executed on the touch panel to trace the object; and continuously switching, when the slide motion is detected, an image to be displayed on the display means.

The present invention provides a recording medium that is read by a computer having a program for executing a display switch method of a reproducing apparatus stored therein, the reproducing apparatus including a display unit which displays an image and a touch panel disposed on the display unit, wherein the display switch method includes:

superimposing an object, which guides a slide motion for drawing a circular or arc locus on the touch panel, on a displayed image and displaying the object on the display unit; and continuously switching, when the slide motion executed on the touch panel to trace the displayed object is detected, an image to be displayed on the display unit.

According to the present invention, there can be provided a reproduction apparatus, a camera, and a display switching method of suitably manipulating a touch panel when a target image is searched from a lot of images and improving the usability of the touch panel.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and configure a part of the specification, illustrate embodiments of the invention, and together with the general description given above and the detailed description of the embodiments given below, serve to explain the principles of the invention.

FIGS. 1A to 1C are views showing the outside appearance of a recording/reproducing apparatus according to an embodiment of the present invention, wherein FIG. 1A is a front elevational view, FIG. 1B is a back surface view, and FIG. 1C is an upper surface view;

FIG. 2 is a constitutional view of the components of the recording/reproducing apparatus of the embodiment;

DETAILED DESCRIPTION OF THE INVENTION

Figure 3:
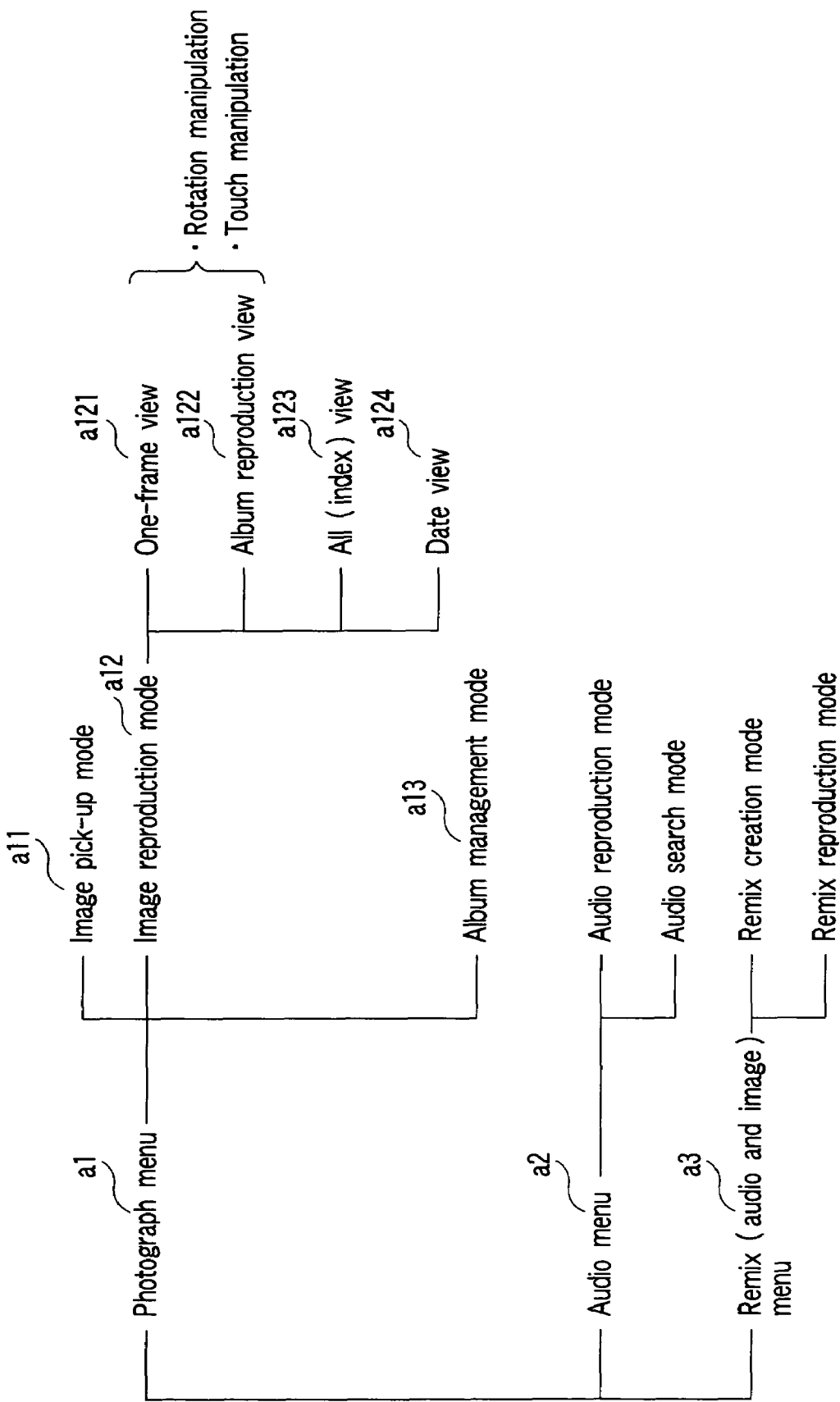
FIG. 3 is a view showing a menu presented by the recording/reproducing apparatus and the hierarchical relation of the main statuses of the recording/reproducing apparatus formed by the menu.

An embodiment of the present invention will be explained below with reference to the drawings.

The embodiment is a mode in which the present invention is applied an audio player with a camera. The functional component of the audio player with the camera relating to an image pick-up configures a camera as an embodiment of the present invention, and the functional component thereof relating to an image reproduction configures a reproducing apparatus as an embodiment of the present invention.

Further, in the following embodiments, a "display unit" of the present invention is mainly composed of an image display unit 62, and a "second object" is mainly composed of objects b1 and b2.

Further, a CPU 22, which executes processing according mainly to predetermined programs, corresponds to an "object display unit", a "detection unit", a "display switch unit", a "first display switch unit", and a "second display switch unit" of the present invention FIGS. 1A to 1C are outside appearance views a recording/reproducing apparatus according to the embodiment of the present invention. The recording/reproducing apparatus 10 is an audio player with a camera and is configured with a cabinet. The cabinet has an image pick-up window 12 for capturing the light from a not shown subject and an illumination window 14 for projecting auxiliary light to the subject each disposed on the front surface thereof.

Further, as shown in FIG. 1B, the cabinet of the recording/reproducing apparatus 10 has an image display device 16 with a touch panel disposed on the back surface thereof. When the operation mode of the recording/reproducing apparatus 10 is in a pick-up mode, a subject image is displayed on the display screen thereof as a so-called monitor image, and when an operator touches an arbitrary detection region of the touch panel (touch motion), the motion is recognized as a so-called release instruction, and an image pick-up process is executed. When the operation mode is in an image reproduction mode, one picked-up image, for example, is displayed on the display screen, and a picked-up image to be displayed is switched according to a predetermined motion executed on the touch panel. The recording/reproducing apparatus 10 of the embodiment improves the usability of the touch panel by making it to be suitably manipulated to switch a displayed image.

Further, as shown in FIG. 1C, the cabinet of the recording/reproducing apparatus 10 has a power supply button 18 on the upper surface thereof to turn on and off a power supply.

FIG. 2 is a constitutional view of the components of the recording/reproducing apparatus 10 of the embodiment and a stand unit 80 annexed to the recording/reproducing apparatus 10.

The recording/reproducing apparatus 10 is configured with a camera device 34 for picking up an image and a reproducing device for storing and reproducing video and audio. The recording/reproducing apparatus 10 is controlled by the CPU 22 in its entirety. A ROM 24, the detection unit 26, and a manipulation unit 28 are connected to the CPU 22 as well as the camera device 34, an image processing unit 36, an image display device 38 with a touch panel, a hard disc 40, an interface (IF) unit 42, and an audio processing unit 44 are connected to the CPU 22 through a system bus 30.

As shown in the figure, the recording/reproducing apparatus 10 is provided with various types of electric processing units such as the CPU 22, the ROM 24, the hard disc 40, and the like. The ROM 24 also stores the data of objects to be described later. Further, the camera device 34 includes a lens 52 disposed to the image pick-up window 12 shown in FIG. 1A, an image pick-up element 54, an image pick-up unit 56, an electric flash device 58, and the like. The light from a not shown subject is incident on the image pick-up element 54 after passes through the lens 52, and a subject image is focused on the image pick-up surface thereof. The image pick-up surface of the image pick-up element 54 is formed by disposing a plurality of pixels in a two-dimensional matrix shape for photoelectric conversion. Further, a color filter is disposed on the image pick-up surface, thereby signal charges are accumulated in correspondence to the subject image focused on the image pick-up surface. The image pick-up element 54 is variously controlled by the image pick-up unit 56 so as to execute exposure, reading, and the like. The output from the image pick-up element 54 is converted into a digital signal by the image pick-up unit 56 and input to the image processing unit 36 as an image signal through the system bus 30. Further, the image pick-up unit 56 also controls the light emission of the electric flash device 58, and the auxiliary light emitted from the electric flash device 58 passes through the illumination window 14 shown in FIG. 1A and illuminates the subject.

The image processing unit 36, which receives the image signal from the camera device 34 through the system bus 30, creates a color image signal of a predetermined format by setting ISO sensitivity to the image signal, and subjecting it to automatic white balance processing, luminance/color signal creation processing, gamma processing, and the like. The color image signal is converted into a format suitable for a display and an output and supplied to the image display device 38 with the touch panel. The image display device 38 with the touch panel is configured with the image display unit 62 for displaying a picked-up image and the touch panel 64. The color image signal supplied to the image display device 38 with the touch panel is displayed on the image display unit 62 as the monitor image in real time, and is converted (compressed and encoded) into a format suitable for record according to an image pick-up instruction and recorded in the hard disc 40 as a picked-up image through the system bus 30.

The status of the touch panel 64 is monitored by the detection unit 26, and when the touch panel is manipulated in any manner, a touched position thereof is detected by the detection unit 26, and the CPU 22 is notified of the information of the touched position. When for example, the CPU 22 is notified of a touch at an arbitrary position, which corresponds to the release manipulation described above, from the detection unit 26, the CPU 22 controls the recording reproduction apparatus in its entirety to record the image being displayed on the image display unit 62 as the monitor image. Further, the CPU 22 controls the apparatus in its entirety by, for example, turning on and off the power supply in response to the control signal from the manipulation unit 28 including the power supply button 18 shown in FIG. 1C, in addition to the notification from the detection unit 26.

As described above, the picked-up image recorded in the hard disc 40 is displayed on the image display unit 62 of the image display device 38 with the touch panel after it is expanded and decoded in the image reproduction mode by the image processing unit 36. The picked-up image displayed on the image display unit 62 is switched in response to the notification from the detection unit 26 to the CPU 22, that is, by a manipulation executed on the touch panel 64 of the image display device 38 with the touch panel.

Further, the recording/reproducing apparatus 10 can be detachably mounted on the stand unit 80 called a cradle. When the recording/reproducing apparatus 10 is mounted on the stand unit 80, a connector 72 disposed on the peripheral wall of the cabinet is engaged with a connector 82 disposed to the stand unit 80, thereby both the connectors 72 and 82 are electrically connected to each other. The stand unit 80 has a USB terminal 84, a video output terminal 86, and a DC input terminal 88 disposed thereto. A personal computer (PC) 92 can be connected to the USB terminal 84, a television (TV) device 94 can be connected to the video output terminal 86, and an AC adapter 96 can be connected to the DC input terminal 88.

The USB terminal 84 is connected to the interface (IF) unit 42 of the recording/reproducing apparatus 10 through the connectors 82 and 72. The recording/reproducing apparatus 10 can communicate with the personal computer 92 under the control of the IF unit 42. For example, it is possible to transfer a picked-up image recorded in the hard disc 40 to the personal computer 92, and to receive compressed and encoded audio data from the personal computer 92 and to record it in the hard disc 40. The recording/reproducing apparatus 10 has an audio reproduction mode as one of the operation modes, and, in the audio reproduction mode, the audio processing unit 44 reads out audio data from the hard disc 40 and outputs it to an audio output terminal 74 after it is expanded and decoded and converted into analog data. A user can listen to the music by connecting a not shown head phone or the like to the audio output terminal 74.

Further, the video output terminal 86 is connected to the image processing unit 36 of the recording/reproducing apparatus 10 through the connectors 82 and 72. The image processing unit 36 supplies a color image signal to the television device 94 in response to the notification from the CPU 22 in place of supplying it to the image display unit 62 of the image display device 38 with the touch panel. At the time, the image processing unit 36 converts the color image signal into a system (NTSC) suitable for a display and an output on and from the television device 94.

Further, the DC input terminal 88 is connected to a power supply circuit 46 of the recording/reproducing apparatus 10 through the connectors 82 and 72. When it is detected that the AC adapter 96 is connected to the power supply circuit 46 through the stand unit 80, a power supply is switched from a battery 48 to the AC adapter 96 as well as the battery 48 is charged with the power from the AC adapter 96.

FIG. 3 is a view showing the menu presented by the recording/reproducing apparatus 10 and the hierarchical relation between the main statuses of the recording reproduction apparatus 10 formed by the menu.

As shown in FIG. 3, the recording/reproducing apparatus 10 first presents three menu items, that is, a photograph menu a1, an audio menu a2, and a remix (hereinafter, reproducing audio and video at a time while relating them to each other is referred to as "remix") menu a3 as alternatives. Note that the CPU 22 of the recording/reproducing apparatus 10 has a so-called suspend/resume function for holding the status thereof when power is turned off by the power supply button 18 as well as resuming the held status when the power is turned on by the power supply button 18. Accordingly, when the power is turned on, the screen at the time the power was turned off last time is presented.

The photograph menu a1 is a menu selected when an image is picked up, a picked-up image is reproduced, and picked-up images are put into order. The audio menu a2 is a menu selected when music is replayed or searched. The remix (audio and image) menu a3 is a menu selected when music is replayed together with images reproduced with a special image effect or when a combination of music, images, and an image effect is set (when a remix is created). Note that these menus are selected by the user who touches the detection regions on the touch panel 64 corresponding to the menus, respectively so that he or she touches the display region on the image display unit 62 of the image display device 38 with the touch panel.

A case, in which the photograph menu a1 according to a touch panel manipulation for switching a display screen is selected, will be explained.

When the photograph menu a1 is selected, the recording/reproducing apparatus 10 next presents a menu for the photograph menu a1 to shift to any of an image pick-up mode a11, an image reproduction mode a12, and an album management menu a13. The image pick-up mode a11 is a mode for picking up an image, the image reproduction mode a12 is a mode for reproducing an image, and the album management mode a13 is a mode for classifying picked-up images in a holder so that they are put in order. When the image reproduction mode a12 is selected, the recording/reproducing apparatus 10 executes reproduction processing for displaying the picked-up images recorded in the hard disc 40 on the image display unit 62 of the image display device 38 with the touch panel.

Four methods, that is, a one-frame view method a121, an album reproduction view method a122, an all (indexes) view method a123, and a date view method a124 are prepared in the recording/reproducing apparatus 10 as methods of displaying the picked-up images. The one-frame view method a121 is a method of displaying the images recorded in the hard disc 40 while switching them one by one in the sequence of, for example, image pick-up dates (in the sequence of the frame number of an image). The album reproduction view method a122 is a method of displaying only the picked-up images in a group (album) arbitrarily selected by the user likewise the one-frame view method a121 in the sequence of image pick-up dates. Further, the all (indexes) view method a123 is a method of displaying the picked-up images in the form of so-called index images by switching the lists of the index images each containing n rows×m columns of thumb-nail images. Further, the date view method a124 is a method of searching the picked-up images whose pick-up date is in coincidence with a designated date from the hard disc 40 and displaying them while switching them one by one time-sequentially.

Among the four methods, the "rotation manipulation" and the "touch manipulation" can be executed in the one-frame view method a121 and the album reproduction view method a122. These manipulations will be explained below in detail.

It is assumed that the recording/reproducing apparatus 10 is placed in the image reproduction mode a12 and that a displayed image is switched by the one-frame view method a121.

Figure 4:
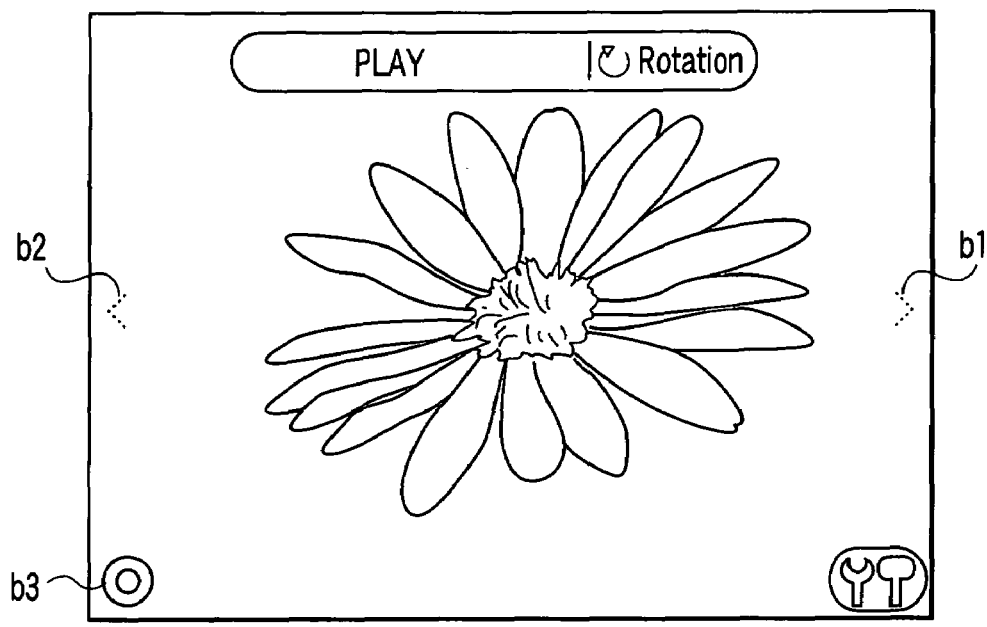
FIG. 4 is a view showing a "touch manipulation" screen displayed by the recording/reproducing apparatus of the embodiment.

FIG. 4 shows an example of a picked-up image displayed on the image display unit 62 of the image display device 38 with the touch panel.

Figure 5:
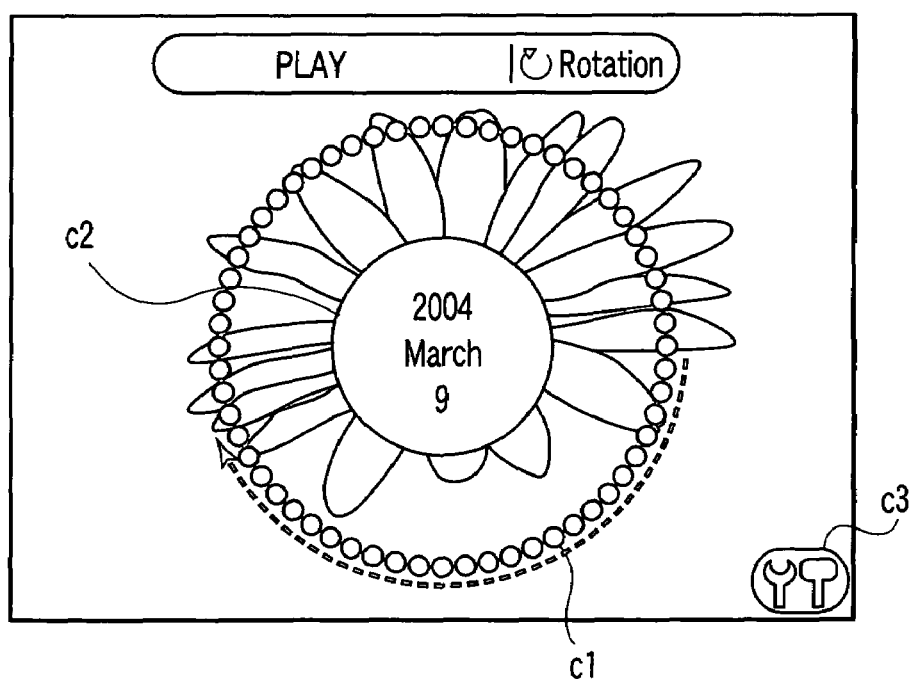
FIG. 5 is a view showing a "rotation manipulation" screen displayed by the recording/reproducing apparatus of the embodiment.

FIG. 4 shows a screen example of the display of a picked-up image when the "touch manipulation" is executed in the one-frame view method a121. In FIG. 4, the picked-up image is displayed on the overall screen as well as various manipulation objects b1 to b3 are displayed in the peripheral portion of the screen. The object b1 is a display for switching a picked-up image one by one in a forward direction (typically, in the sequence from older to newer pick-up dates) one by one. When the user touches the display region of the object b1, that is, when the user touches a corresponding detection region on the touch panel 64, a picked-up image next to the picked-up image being displayed at present (for example, a picked-up image having a recording date next new to the image being displayed) is read out from the hard disc 40 and displayed. In contrast, the object b2 is a display for switching a picked-up image one by one in a sequence opposite to that of the object b1. That is, the "touch manipulation" is a manipulation for switching a picked-up image one by one by manipulating the touch panel once. The object b3 is a display for shifting from the "touch manipulation" to the "rotation manipulation", and when the user touches the object b3, the display on the image display unit 62 is switched as shown in FIG. 5.

Figure 6:
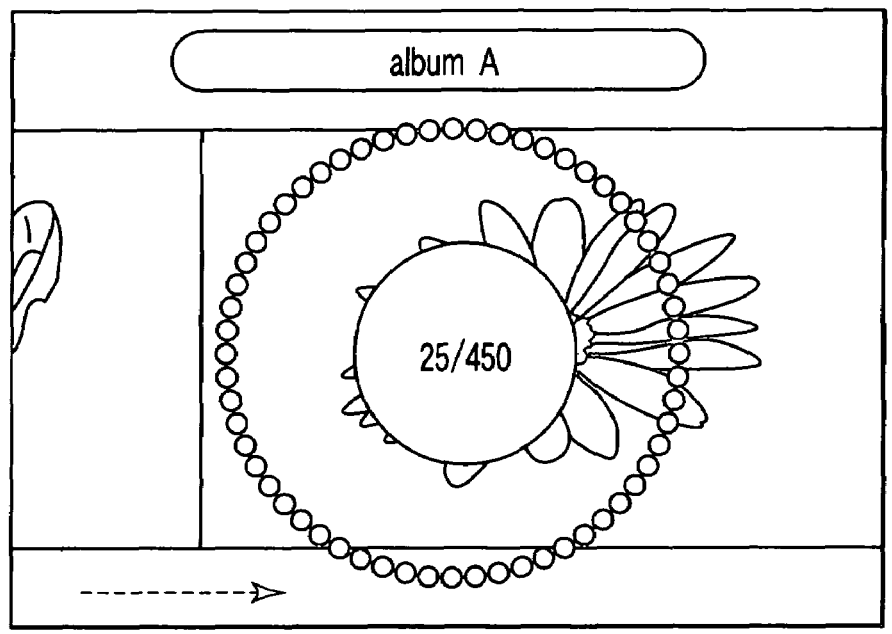
FIG. 6 shows how the recording/reproducing apparatus of the embodiment switches a displayed image in response to a "rotation manipulation"

When the "rotation manipulation" is switched to the "screen", an annular object c1 is displayed in a central portion so as to be superimposed on a picked-up image. The object c1 is a display for continuously switching the picked-up image, and when the object c1 is (slide motion executed in the direction of an arrow shown by a broken line in the figure) so as to draw a circle in a first direction (for example, clockwise), four picked-up images for example, are switched every one rotation, that is, each one image is continuously switched in the forward direction every time an arc of about 90° is drawn. FIG. 6 shows how the picked-up image is switched by the "touch panel manipulation" as one example. In this example, as shown in FIG. 6, in the "rotation manipulation", a picked-up image before it is switched is continuously switched is as if it is pushed out by a picked-up image appearing after it is switched in a slide system. That is, since images are gradually switched according to the angle of an arc, a feeling of forwarding and returning a film can be realized.

Note that, in the case of the "rotation manipulation", all the picked-up image are not used as the images to be displayed, and a typical image of each date (for example, a first image picked-up on each day), a typical image of each month, and a typical image of each year can also be used as the images to be displayed. Accordingly, in this condition, when the picked-up images are set such that they are switched in the unit of a date, a picked-up image being displayed is switched to a typical image of a next new pick-up date when a circle is drawn along the object c1. That is, a high speed search can be executed at intervals of a predetermined unit time as compared with the "touch manipulation". It is needless to say that all the recorded-images may be switched by the "rotation manipulation" one by one according to an image pick-up sequence in place of the typical image.

Further, when the object c1 is traced so as to draw a circle in a second direction (for example, counterclockwise) opposite to the first direction described above, the picked-up images are continuously switched in the opposite direction in the same manner as that in the first direction. That is, the "rotation manipulation" is a manipulation for continuously switching a picked-up image by manipulating the touch panel to draw a circle or an arc. When it is desired to forward many images, it is required to move a finger quickly in the "touch manipulation". Further, when the touch panel is manipulated to draw, for example, a straight line, a motion for returning a finger to the start point is necessary each time a line segment is drawn from an end on a start point side to the other end on a terminal point side. In contrast, manipulating the touch panel to draw a circle is a motion suitable also from the viewpoint of human engineering, thereby the picked-up images can be continuously switched and the usability of the touch panel can be improved.

Note that the manipulation of the touch panel for executing the "rotation manipulation" may be started from any position on the object c1. Further, to indicate that the manipulation is securely recognized as the "rotation manipulation" to the user, the recording/reproducing apparatus 10 may momentarily make an outer peripheral position of the object c1 highly bright by tracing the movement of the finger, that is, tracing the locus of the circle drawn by the finger. With this operation, since an image as if a luminescent spot travels on the object c1 can be presented to the user, it can be notified that the "rotation manipulation" is accepted. Further, when the object c1 is superimposed on a picked-up image, it is preferable that the object c1 made to half tone (semi-transparent) is displayed so that the portion of the picked-up image corresponding to the object c1 is referred through the object.

Further, when the object c1 is displayed for the "rotation manipulation", information as to each picked-up image is displayed at a position corresponding to the center of the object c1 (refer to c2 of FIG. 5 and the like). Here, as the information, the image pick-up date of each picked-up image is displayed. As other example of this information, as shown in FIG. 6, a numeral, which indicates what number (numerator) of the total number (denominator) of the picked-up images is occupied by each picked-up image, may be displayed in the "rotation manipulation".

Further, an object c3 located lower right of the display of the image display unit 62 shown in FIG. 5 is a display for shifting to a set screen for setting the magnitude of a unit of time when a display screen is switched by the "rotation manipulation". When the user touches the object c3, the display of the image display unit 62 is switched to a set screen as shown in FIG. 7.

Figure 7:
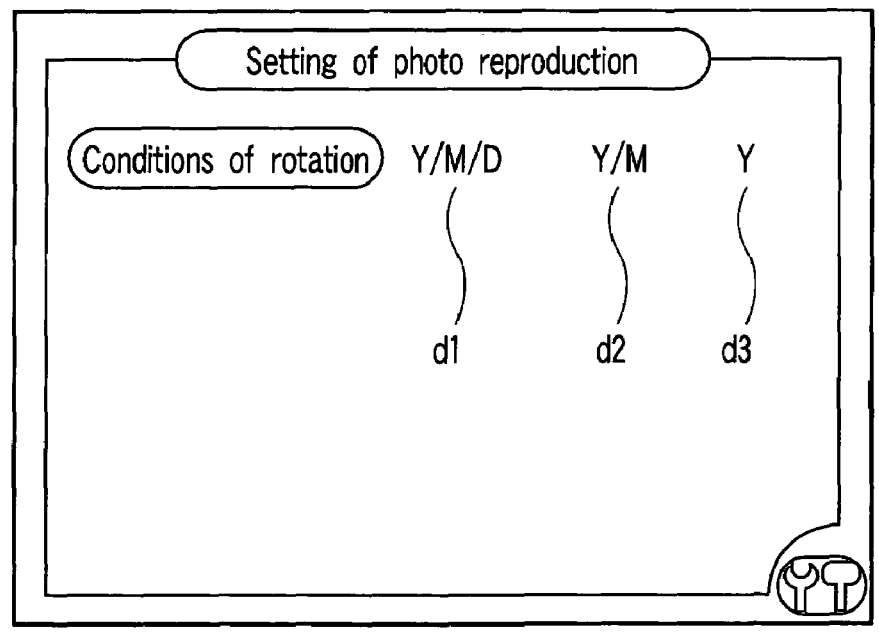
FIG. 7 is a view showing a "rotation manipulation" set screen shown by the recording/reproducing apparatus of the embodiment.

As shown in FIG. 7, three alternatives, that is, "Y/M/D"d1, "Y/M"d2, and "Y"d3 are presented on the set screen. When "Y/M/D"d1 is selected, the typical images of respective dates are sequentially displayed in a unit of date. When "Y/M" d2 is selected, the typical images of respective months are sequentially displayed in a unit of month. When "Y"d3 is selected, the typical images of respective years are sequentially displayed in a unit of year.

Next, the operation principle of an image reproduction mode of the recording/reproducing apparatus 10 will be explained with reference to the flowcharts of FIGS. 8 to 11.

Figure 8:
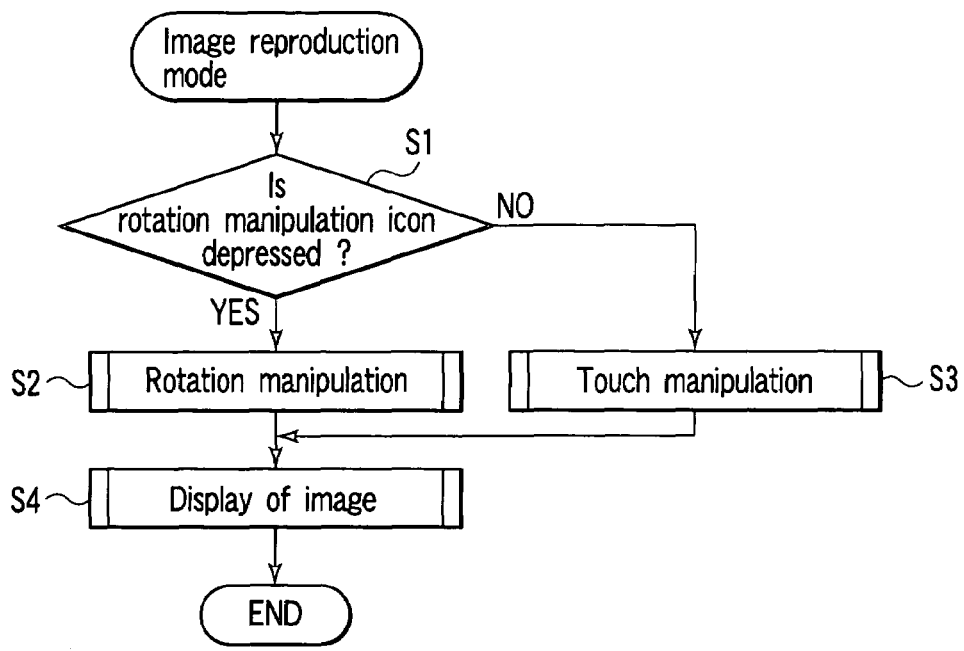
FIG. 8 is a flowchart showing a basic flow in an image reproduction mode of the recording/reproducing apparatus of the embodiment.

FIG. 8 is a flowchart of a basic operation in the image reproduction mode.

In the image reproduction mode, at step S1, the CPU 22 determines whether or not a rotation manipulation icon shown by the object b3 of FIG. 4 is brought into contact based on the notification from the detection unit 26. When the rotation manipulation icon is brought into contact here, the process goes to step S2, and the CPU 22 executes a subroutine "rotation manipulation". The operation of the subroutine "rotation manipulation" will be explained later in detail.

In contrast, when the rotation manipulation icon is not brought into contact at step S1, the process goes to step S3 at which the subroutine CPU 22 executes a subroutine "touch manipulation". The operation of the subroutine "touch manipulation" will be explained later in detail. The CPU 22 executes a subroutine "image display" according to the "rotation manipulation" or the "touch manipulation" executed at step S2 or S3. Note that the operation of the subroutine "image display" will be explained later in detail.

Figure 9:
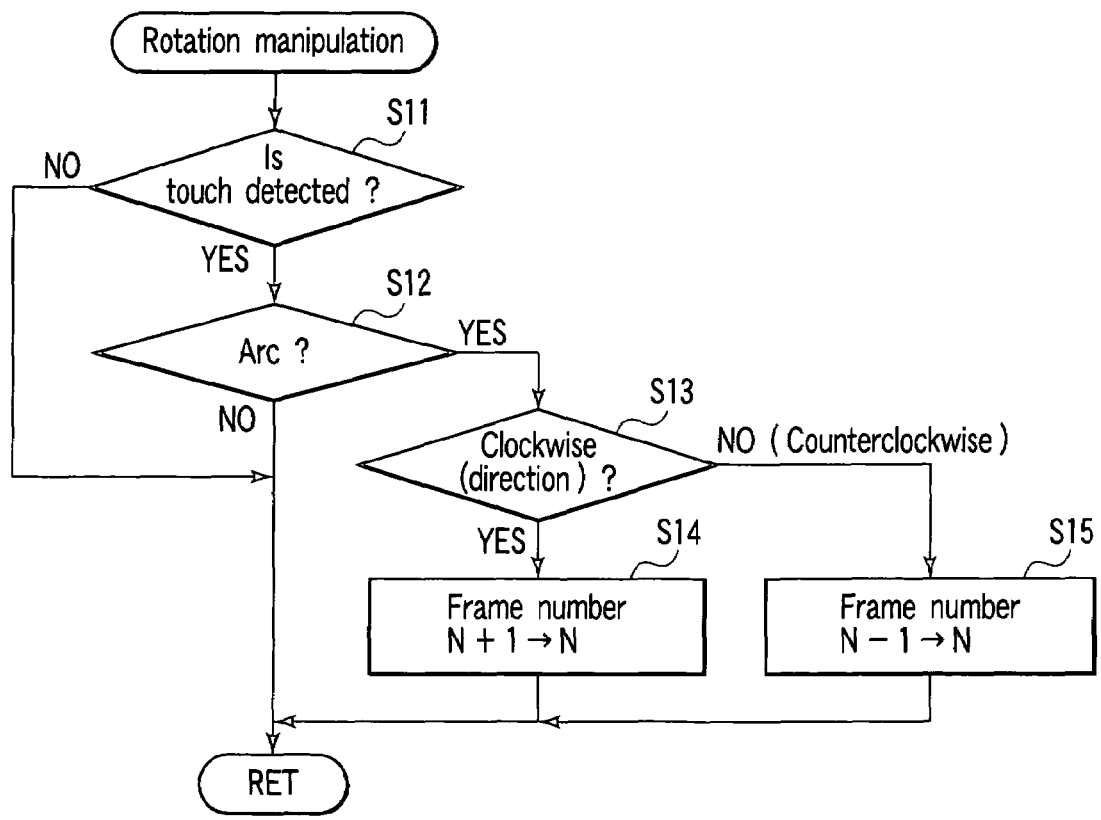
FIG. 9 is a flowchart showing the flow of the "rotation manipulation" executed by the recording/reproducing apparatus of the embodiment.

Next, the detailed operation of the subroutine "rotation manipulation" at step S2 of FIG. 8 will be explained with reference to a flowchart of FIG. 9.

In the rotation manipulation, at step S11, the CPU 22 determines whether or not the touch panel is manipulated based on the notification from the detection unit 26. When the touch panel is manipulated in any manner, the CPU 22 determines whether or not the manipulation is a motion for tracing the object c1 shown in FIG. 5 at subsequent step S12.

When the manipulation at step S12 is the trace motion, the process goes to step S13 at which the CPU 22 determines whether or not the trace motion is executed clockwise. As a result, when the motion is executed clockwise, the process goes to step S14, at which the frame number of an image to be displayed is incremented by 1 in a forward direction (an image that the image pick-up date is new). In contrast, when the motion is executed counterclockwise, the process goes to step S15 at which the frame number of an image to be displayed is decremented by one in a rearward direction. Thereafter, the process leaves the routine. Note that an image to be switched may be a typical image as described above.

Further, when no manipulation is executed at step S11 or when a motion for tracing the object c1 is not executed at step S12, the process skips steps S13 to S15 and leaves the routine.

Figure 10:
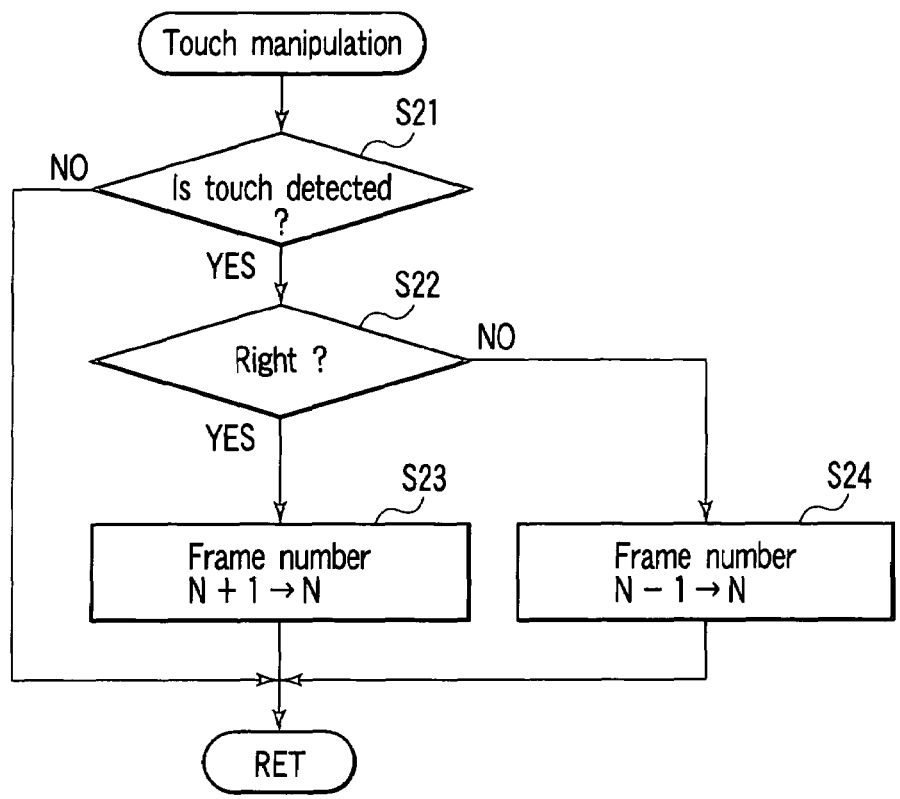
FIG. 10 is a flowchart showing the flow of the "touch manipulation" executed by the recording/reproducing apparatus of the embodiment.

Next, the detailed operation of the subroutine "touch manipulation" executed at step S3 of FIG. 8 will be explained with reference to the flowchart of FIG. 10.

In the touch manipulation, at step S21, the CPU 22 determines whether or not the touch panel is manipulated based on the notification from the detection unit 26. When the touch manipulation is detected, the CPU 22 determines whether or not the object b1 shown in FIG. 4 is brought into contact by the manipulation at subsequent step S22. When it is determined at step S22 that the object b1 is brought into contact, the process goes to step S23 at which the frame number of an image to be displayed is incremented by one in the forward direction. Whereas when it is determined that the object b1 shown in FIG. 4 is not brought into contact by the manipulation at step S22, that is, when the object b2 shown in FIG. 4 is brought into contact, the process goes to step S24 at which the frame number is decremented by one in the rearward direction. Thereafter, the process leaves the routine.

Further, it is determined at step 21 that no manipulation is executed, the process skips steps S22 to S24 and leaves the routine.

Figure 11:
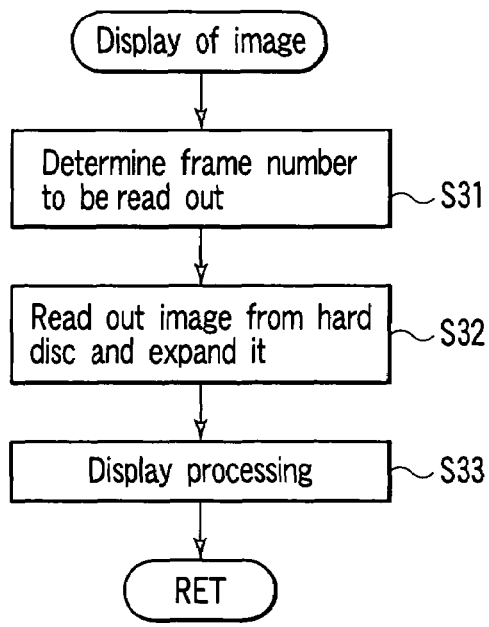
FIG. 11 is a flowchart showing the flow of an image display executed by the recording/reproducing apparatus of the embodiment.

Next, the detailed operation of the subroutine "image display" at step S3 of FIG. 8 will be explained with reference to the flowchart of FIG. 11.

When the rotation manipulation or the touch manipulation described above is executed, the CPU 22 specifies the frame number of an image to read from the hard disc 40 at step S31. Then, at step S32, the image of the specified frame number is read out from the hard disc 40 as well as the image is decoded and expanded by the image processing unit 36. Further, at step S33, the image processed at step S32 is displayed on the image display unit 62 of the image display device 38 with the touch panel by the CPU 22.

As described above, in the recording reproduction apparatus of the embodiment, when it is desired to continuously and promptly forward a lot of images, they can be forwarded by a touch panel manipulation for drawing a circle which is also suitable from the viewpoint of human engineering, the usability of the touch panel can be improved.

Incidentally, FIG. 5 shows the example that the annular object c1 is displayed in the central portion of the screen as the display of a guide of the "rotation manipulation". However, the guide is by no means limited thereto and various shapes of the guide may be applied as long as they can guide the manipulation of the touch panel for the "rotation manipulation".

Figure 12A:
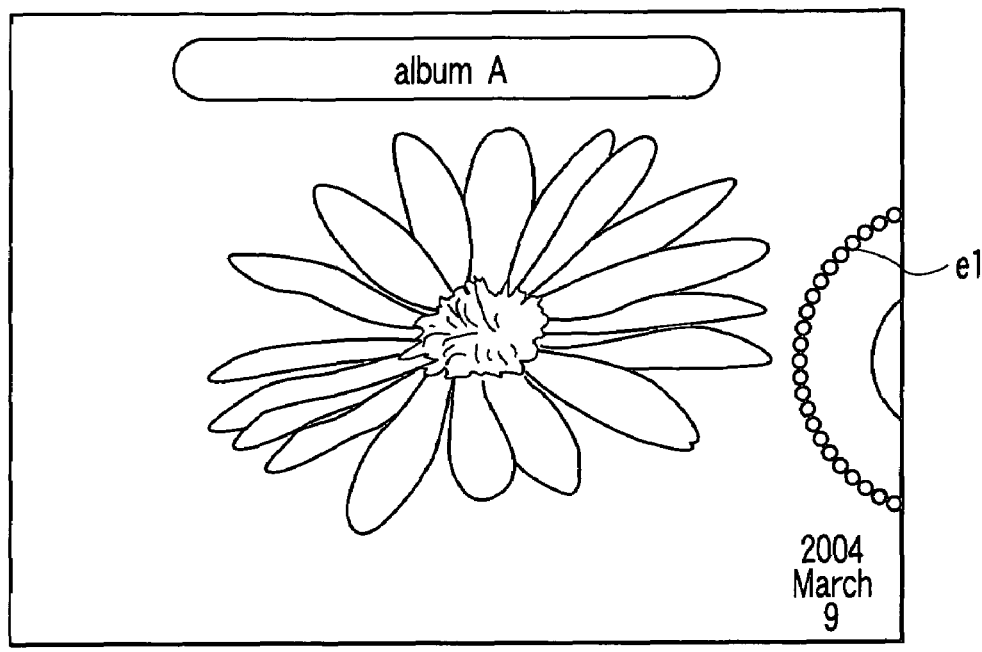
FIGS. 12A and 12B are view showing a first modification of the "rotation manipulation" screen displayed by the recording/reproducing apparatus of the embodiment.
Figure 12B:
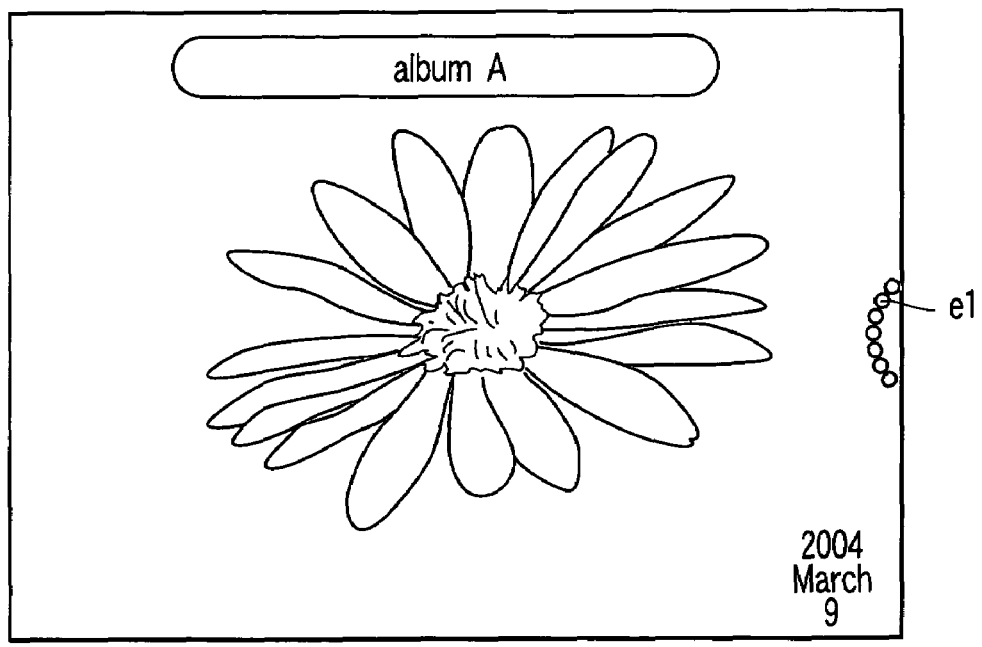

As shown in FIGS. 12A and 12B, an arc (for example, semi-circular) object e1 may be displayed in the peripheral portion of the screen to guide the manipulation of the touch panel so as to draw an arc, in place of displaying the circle indicated by c1 in, for example, FIG. 5. Also in this case, when the user moves a finger so as to draw a circle, the touch panel can be manipulated to draw an arc by a part of the motion of the finger as well as an affect to a displayed image can be reduced (to prevent the confirmation of a displayed image from being obstructed).

In this case, the information (c2 in FIG. 5 and the like) displayed at the position corresponding to the center of the object c1 in FIG. 5 may be displayed in a lower right portion and the like of the screen as shown in, for example, FIGS. 12A and 12B. It is needless to say that the arc need not be necessarily drawn by a part of the motion for drawing the circle and may be drawn by a method optionally selected by the user.

Further, when, for example, the touch panel is manipulated to bring into contact with the display region thereof, the object e1 is accommodated outside of a frame with an end thereof remaining within the frame from the state shown in FIG. 12A to the state shown in FIG. 12B in view of appreciating an image while executing the "rotation manipulation". When the touch panel is manipulated so that the remaining end of the object e1 is depressed, it is also effective to display the object e1 after the state thereof shown in FIG. 12B is restored to the state thereof shown in FIG. 12A.

The display control can be also executed to the annular object c1 displayed in the central portion of the screen shown in FIG. 5.

Figure 13:
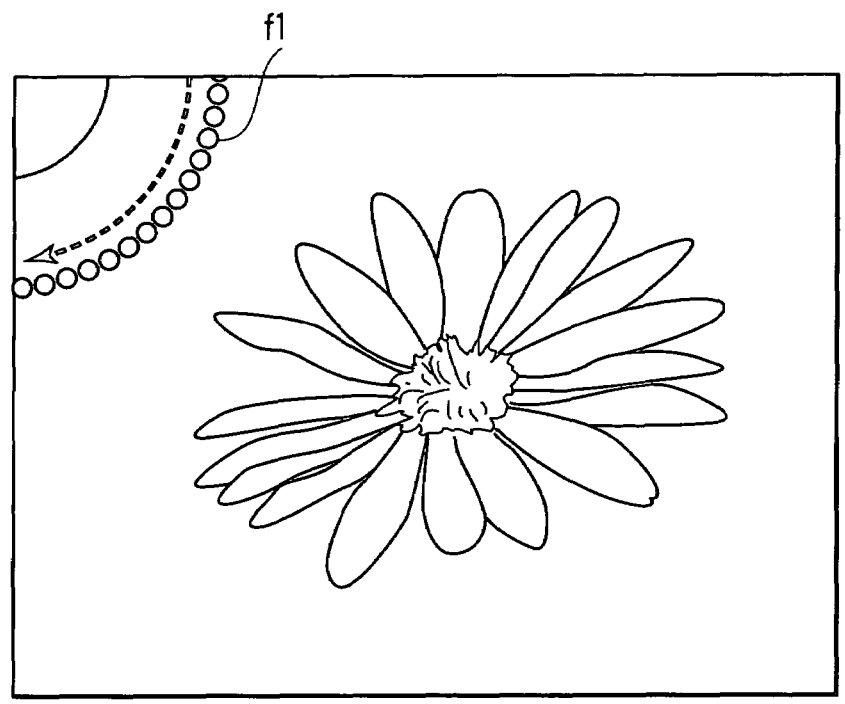
FIG. 13 is a view showing a second modification of the "rotation manipulation" screen displayed by the recording/reproducing apparatus of the embodiment.

Further, as a guide displayed to draw the arc by a part of the motion for drawing the circle, it is also possible to dispose a fan-shaped object f1 at, for example, an upper left corner and the like as shown in FIG. 13, in addition to a side of the rectangular display screen. An applied example of switching the display screen, which can be made possible by disposing the fan-shaped object f1 at, for example, the upper left corner and the like, will be explained below.

Figure 14:
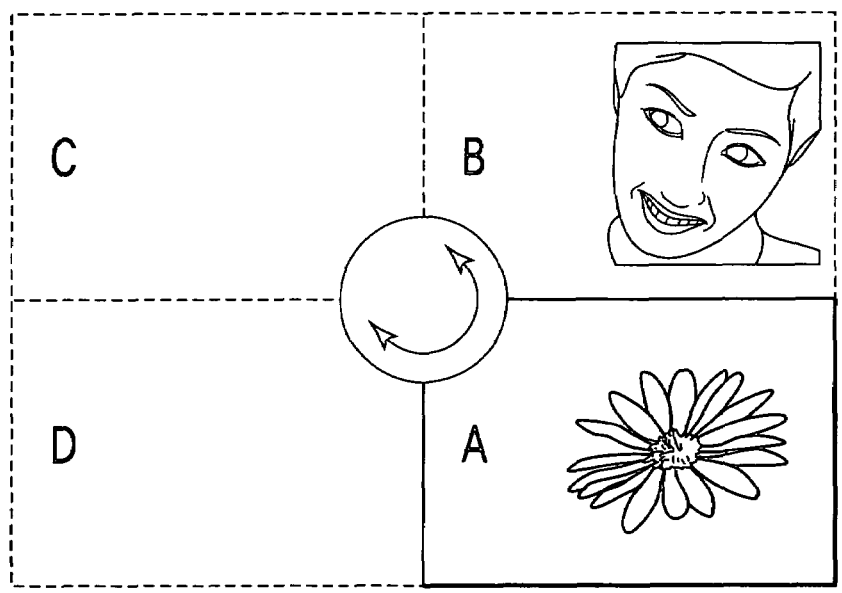
FIG. 14 is a first view explaining an applied example of a second modification of the "rotation manipulation" screen displayed by the recording/reproducing apparatus of the embodiment (concept when a screen is switched)
Figure 15:
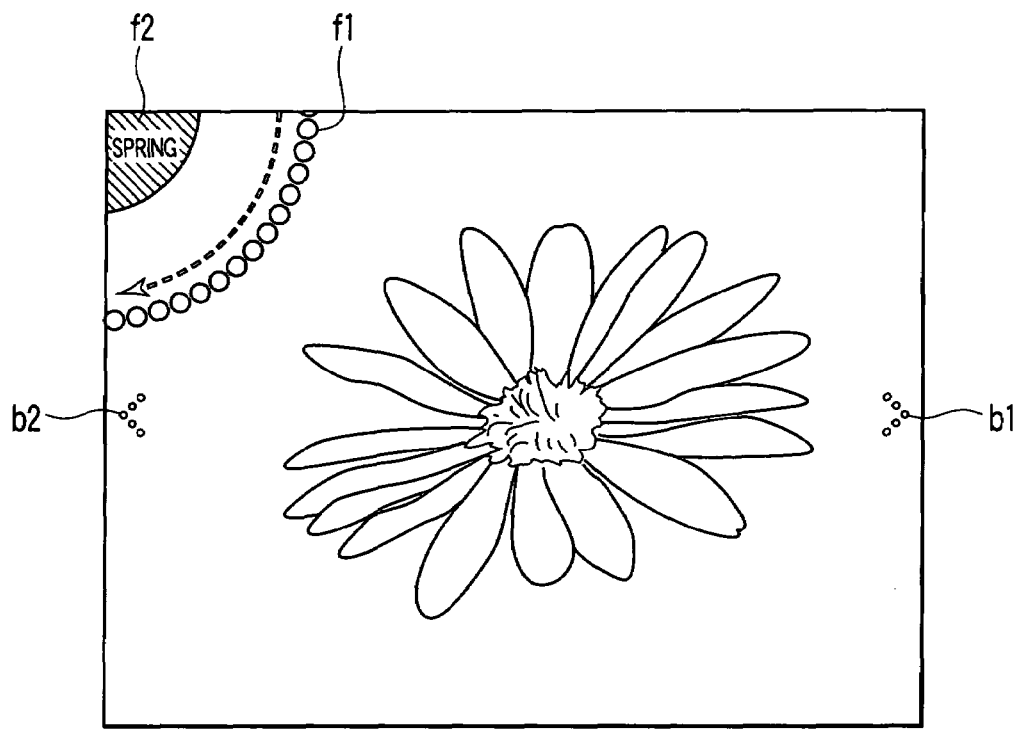
FIG. 15 is a second view explaining an applied example of the second modification of the "rotation manipulation" screen displayed by the recording/reproducing apparatus of the embodiment (typical image of the category of "spring")

It is assumed here that all the picked-up images are classified to categories so that they belong to any of "spring", "summer", "autumn", and "winter". The category means the group of the images likewise the album described above. FIG. 14 shows the concept of classification to the categories composed of fields A to D. It is assumed that the image display unit 62 displays a typical image of "spring" shown in FIG. 15. As shown in the figure, information indicating that the category is "spring" is shown in the central portion of the object f1 (object f2).

Figure 16:
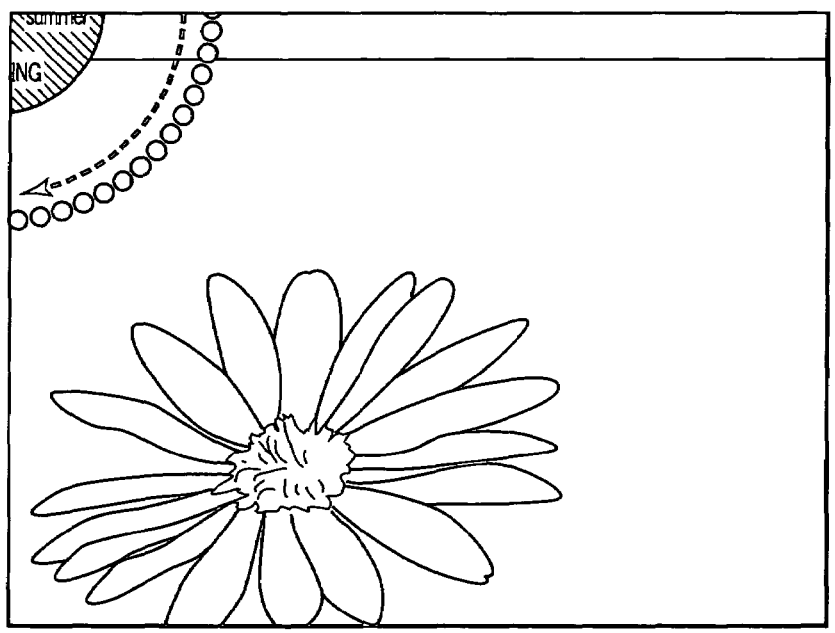
FIG. 16 is a third view explaining an applied example of the second modification of the "rotation manipulation" screen displayed by the recording/reproducing apparatus of the embodiment (showing how a category shifts from "spring" to "summer")
Figure 17:
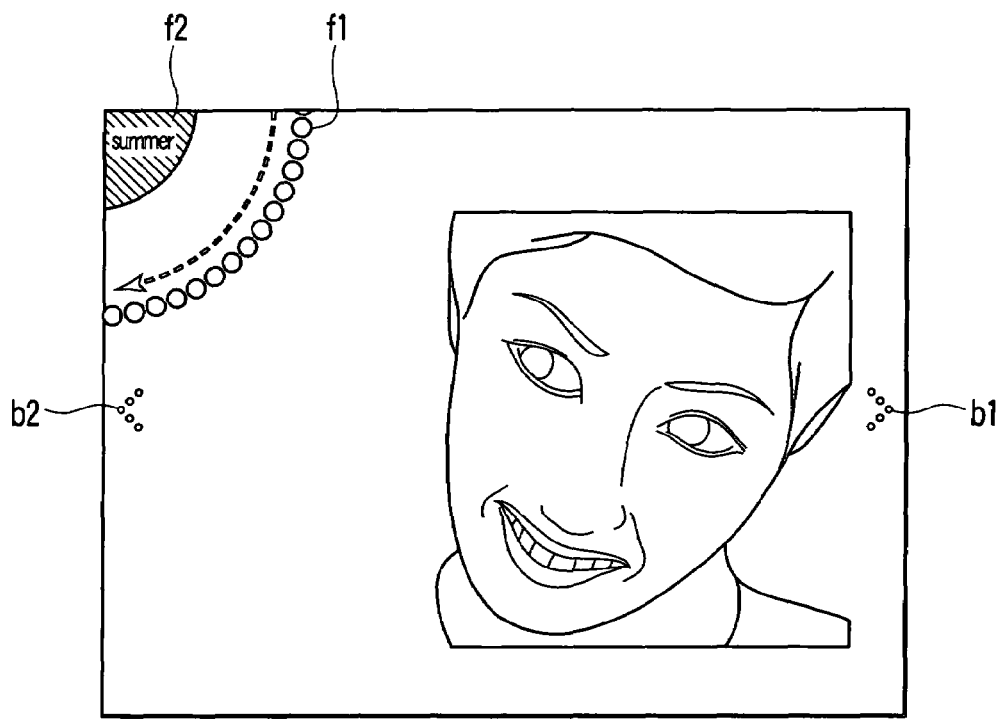
FIG. 17 is a fourth view explaining an applied example of the second modification of the "rotation manipulation" screen displayed by the recording/reproducing apparatus of the embodiment (typical image of the category of "summer")

If the object b1 or b2 is touched to switch a displayed image one by one in the forward or rearward direction, the CPU 22 switches the images belonging to the category of "spring" in a forward or rearward direction according to image pick-up dates. In contrast, when the touch panel is manipulated so that the upper left object f1 is traced in the direction of the arrow of a broken line shown in FIG. 15, a category to be displayed is switched from "spring" to "summer" while showing a behavior as if an upper image falls as shown in FIG. 16, that is, as if a field B shown in FIG. 14 shifts to the region of a field A, thereby a typical image of "summer" is displayed as shown in FIG. 17.

As shown in the figure, the information presented in the central portion of the object f1 is also switched to information whose category belongs to "summer" accordingly (object f2). That is, switching is executed between the categories on a large scale by the object f1 as well as in the categories on a small scale by the objects b1 and b2. Accordingly, when the objects b1 and b2 are touched in the state shown in FIG. 17, switching can be executed in the category of "summer" in the forward or rearward direction, and when the object f1 is traced in the direction of the arrow of the broken line, the category of "summer" can be further switched to the category of "autumn".

Note that although the applied example of the four categories classified to "spring", "summer", "autumn", and "winter" has been explained as shown in FIG. 14, the present invention is by no means limited thereto, and when there are two or more categories, they may be circularly switched by tracing the object f1 on the touch panel. Further, when picked-up images are managed in a unit called an "album" as means for the photographer to optionally classify images according to preference, an album may be switched by tracing the object f1 on the touch panel, and forward or rearward switching may be executed in the album by tracing the objects b1 or b2 on the touch panel.

Figure 18:
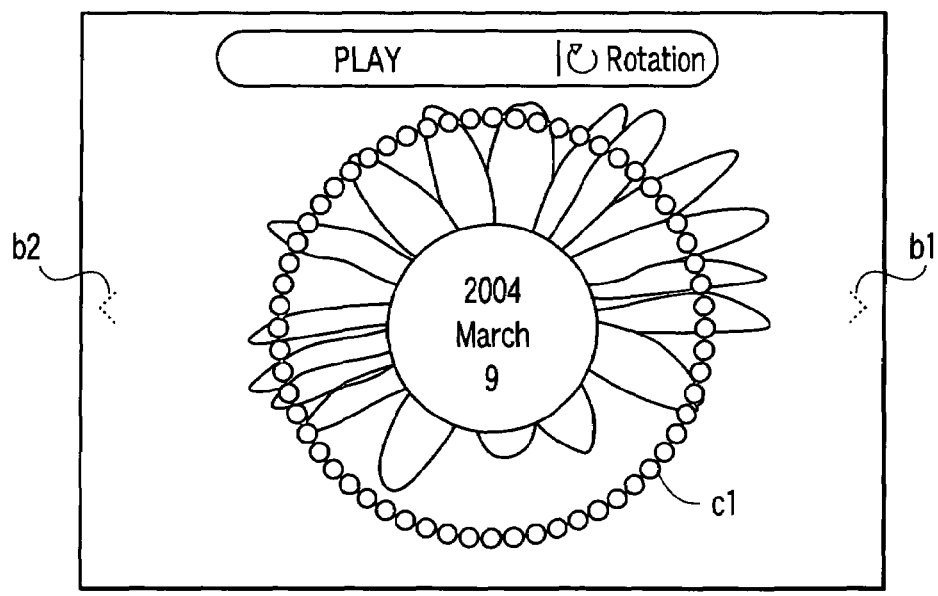
FIG. 18 is a view showing an example when the recording/reproducing apparatus of the embodiment accepts the "touch manipulation" and the "rotation manipulation" on the same screen.

In addition to the above mentioned, the object c1 for "rotation manipulation" may be disposed together with the objects b1 and b2 for "touch manipulation" as shown in FIG. 18 so that "touch manipulation" and "rotation manipulation" can be executed on the same screen. Here, when images are switched one frame by one frame by one of manipulations and typical images of, for example, a unit of a month are switched by the other manipulation, a searching property can be more enhanced.

Figure 19:
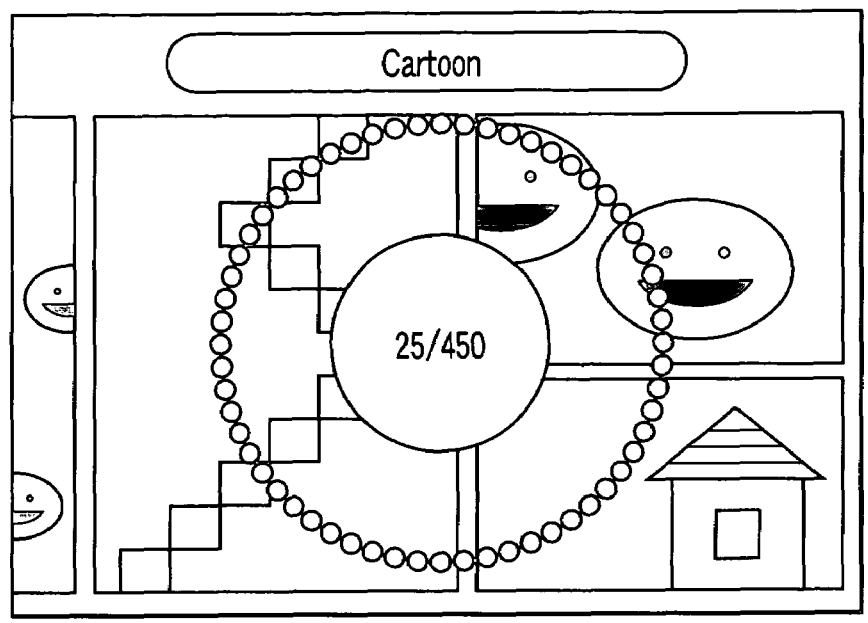
FIG. 19 is a view showing a first applied example of the "rotation manipulation" executed by the recording/reproducing apparatus of the embodiment.
Figure 20:
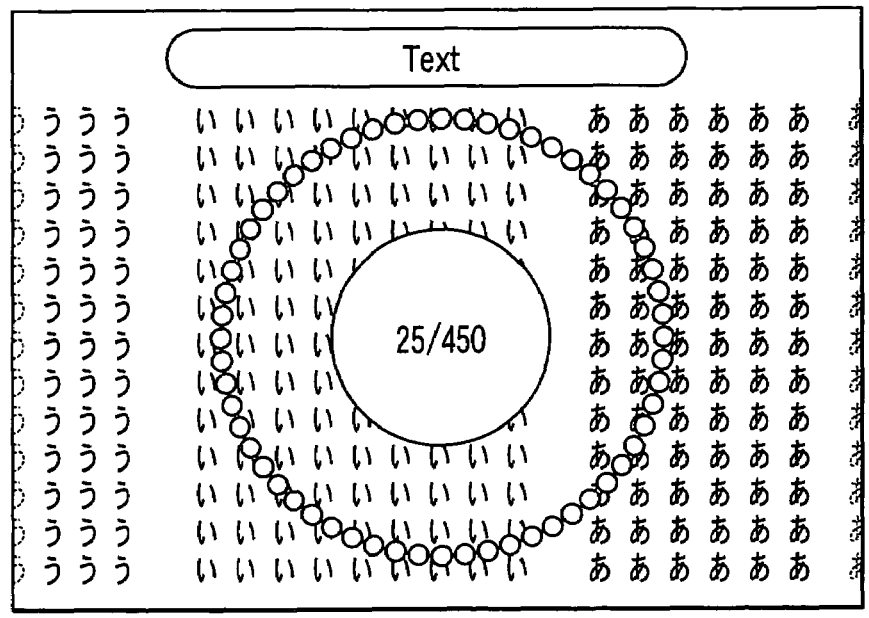
FIG. 20 is a view showing a second applied example of the "rotation manipulation" executed by the recording/reproducing apparatus of the embodiment.

Note that although the example in the embodiment described above shows that the guide display which guides "rotation manipulation" to the touch panel, is superimposed on a picked-up image, "rotation manipulation" of the touch panel may be accepted without displaying the guide. Further, although the example for displaying a picked-up image is shown in the embodiment described above, the embodiment is by no means limited thereto, and it is of course possible to apply "rotation manipulation" to switch a displayed cartoon and a displayed document as shown in FIG. 19 and FIG. 20.

Further, the embodiment 1 is realized by the control processing of the CPU 22 executed according to a program, that is, the function of the embodiment described above is realized by the program itself. Accordingly, the program constitutes by itself the present invention.

The program may be stored in a type of a recording medium other than the ROM 24 described above and may be stored in a recording medium detachably mounted on the recording/reproducing apparatus. Optical recording mediums such as DVD and the like, magnetic recording mediums such as MD and the like, semiconductor memories such as a tape medium, IC card, and the like may be used, in addition to a floppy disc and CD-ROM. A recording medium in which the program is stored also constitutes the present invention.

Further, storage units such as a hard disc, a RAM, and the like, which are disposed to a server system connected to a dedicated communication network and to the Internet, may used as the recording medium, and the program may be presented through the communication network. Otherwise, even if the functions of the embodiment described above are realized in cooperation with other application software and the like, it is needless to say that the program is included in the embodiment of the present invention.

It should be noted that although the processings executed to the embodiment are realized by executing the program on the CPU, the present invention is by no means limited thereto, and, for example, the processings may be partly or entirely realized by hardware.

Although the audio player with the camera has been explained as the embodiment described above, it is needless to say that the embodiment is not limited thereto. When, for example, the audio reproduction function is eliminated from the recording/reproducing apparatus 10, the embodiment is arranged as an ordinary digital camera. Accordingly, the present invention can be applied to a digital camera. Further, it is also possible to apply the embodiment to a mobile-phone with a camera.

Further, the present invention is by no means limited to the embodiment described above and can be embodied by modifying the components thereof within the scope that does not depart from the gist of the invention. Further, various types of inventions can be accomplished by appropriately combining the plurality of components disclosed in the embodiment. For example, several components may be omitted from all the components shown in the embodiment. Further, the components of different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reproduction apparatus comprising:
   a touch panel disposed on a display screen;
   a first display switch unit which continuously switches, when a slide motion for drawing a circular or arc locus is executed on the touch panel, an image on the display screen; and
   an object display unit which causes an object, which guides the slide motion, to be superimposed on a displayed image and to be displayed the object on the display screen and causes an image pick-up date of each picked-up image to be displayed in a location corresponding to the center of the circle or the arc of the object.

2. A reproduction apparatus according to claim 1, further comprising a second display switch unit which switches, when a single touch motion is executed to the touch panel, the image on the display screen to another image.

3. A reproduction apparatus according to claim 2, wherein the object display unit makes the object semi-transparent and displays the object so that the portion of the displayed image on which the object is superimposed is referred through the object.

4. A reproduction apparatus according to claim 1, wherein the first display switch unit continuously switches the image on the display screen according to the slide motion executed in the central portion of the display screen to draw the circular or arc locus.

5. A reproduction apparatus according to claim 4, wherein the second display switch unit switches the image on the display screen to prior and subsequent images according to the touch motion executed in the peripheral portion of the display screen.

6. A reproduction apparatus according to claim 1, wherein the first display switch unit continuously switches the image on the display screen according to the slide motion executed in the peripheral portion of the display screen for drawing the arc locus.

7. A camera comprising:
   the reproduction apparatus according to claim 1; and an image pick-up device,
   wherein first and second display switch units of the reproduction apparatus switch a display as to an image picked up by the image pick-up device.

* * * * *